(12) United States Patent
Lee et al.

(10) Patent No.: US 11,546,465 B2
(45) Date of Patent: Jan. 3, 2023

(54) SYSTEM AND METHOD FOR PROVIDING ONE NUMBER SERVICE IN TELECOMMUNICATIONS RELAY SERVICE

(71) Applicant: Mezmo Corporation

(72) Inventors: Sungho Lee, Fullerton, CA (US); Wonjae Cha, Yongin-si (KR); Jong Oh Choi, Siheung-si (KR)

(73) Assignee: MEZMO CORPORATION, Buena Park, CA (US)

( * ) Notice: Subject to any disclaimer, the term of this patent is extended or adjusted under 35 U.S.C. 154(b) by 173 days.

(21) Appl. No.: 17/111,358

(22) Filed: Dec. 3, 2020

(65) Prior Publication Data
US 2022/0182489 A1 Jun. 9, 2022

(51) Int. Cl.
*H04M 3/42* (2006.01)
*G10L 15/30* (2013.01)
*G10L 15/26* (2006.01)

(52) U.S. Cl.
CPC ......... *H04M 3/42391* (2013.01); *G10L 15/26* (2013.01); *G10L 15/30* (2013.01); *H04M 3/42059* (2013.01)

(58) Field of Classification Search
CPC .......... H04M 3/42391; H04M 3/42059; G10L 15/26; G10L 15/30
See application file for complete search history.

(56) References Cited

U.S. PATENT DOCUMENTS

| | | | |
|---|---|---|---|
| 10,505,889 B2 * | 12/2019 | Lew | H04L 51/52 |
| 11,310,368 B2 * | 4/2022 | Garcia | H04M 15/735 |
| 11,343,374 B1 * | 5/2022 | Rolia | H04M 3/2281 |
| 2021/0218779 A1 * | 7/2021 | Wu | H04L 61/4557 |
| 2022/0078216 A1 * | 3/2022 | Khoury | H04L 65/1069 |
| 2022/0086269 A1 * | 3/2022 | Gao | H04M 1/2753 |
| 2022/0150352 A1 * | 5/2022 | Engelke | H04M 1/2473 |

* cited by examiner

*Primary Examiner* — Lisa Hashem
(74) *Attorney, Agent, or Firm* — Heedong Chae; Lucem, PC

(57) ABSTRACT

A system includes a TRS system for providing a transcription service to a user of the TRS system during a phone call with a peer and a communications device of the user which includes a phone call unit associated with the phone number and a TRS call unit associated with the virtual number. The TRS system includes a database which stores a phone number and a virtual number of the user, wherein the phone number is assigned from a carrier of the user and the virtual number is assigned from a TRS provider to the user; and a communications device of the user which includes a phone call unit associated with the phone number and a TRS call unit associated with the virtual number.

18 Claims, 4 Drawing Sheets

SYSTEM AND METHOD FOR PROVIDING ONE NUMBER SERVICE IN TELECOMMUNICATIONS RELAY SERVICE

FIELD OF THE INVENTION

The present invention relates to a telecommunications relay service system, and more particularly, a system and method for providing one number service in a telecommunications relay service.

BACKGROUND OF THE INVENTION

Typically, mobile users are assigned a cell number from a mobile carrier when purchasing a mobile cellular device. Hearing impaired users, particularly those who are deaf or hard-of-hearing users, also have their cell phone numbers assigned by their respective mobile carriers, but such hearing-impaired users use mainly text-oriented services. Generally, the term "hearing impairment" describes people with any degree of hearing loss (from mild to profound), and thus hearing-impaired individuals includes those who are hard-of-hearing, deaf, or deafened.

When hearing-impaired users communicate with individuals with normal hearing through text-oriented services, many of the former feels that there is a limit to the delivery of nuance and expressive content in text-oriented communication. Also, the latter sometimes feel uncomfortable with text messaging, as speech-related nuances may be missed over text.

Therefore, hearing-impaired users (hereinafter referred to as "users") join a Telecommunications Relay Service (hereinafter referred to as "TRS") to use voice calls for smooth communication with other people. However, when a hearing-impaired subscriber (hereinafter referred to as "TRS user") uses a general text service, the TRS user's cell number is the number that is displayed as the caller ID on the phone of the other party who received the text (hereinafter referred to as "peer user"), and when using voice or video call service using TRS, the virtual number of the TRS remains as a caller ID in the phone of the peer user. That is, the peer user must have both numbers stored, and it is likely that the peer user will later confuse the two numbers when calling-back to the TRS user. To simplify the process and avoid such confusion, TRS users want to use a single integrated number when communicating with the peer users so that peer users need only to remember one phone number for the TRS user and the TRS user can utilize services like TRS to allow them to have richer communication content. Unfortunately, current TRS providers do not support these features.

Therefore, to solve the above problems, various embodiments of a system and a method are provided to enable the TRS user to use the SMS/MMS (hereinafter "short message service/multimedia messaging service") and TRS while using one cell number assigned by their mobile carrier, as there is a need for such a system and a method that accomplish this goal.

This invention is directed to solve these problems and satisfy the long-felt need.

SUMMARY OF THE INVENTION

The present invention contrives to solve the disadvantages of the prior art. The present invention provides a system and a method for providing a one number service in a telecommunications relay service.

The object of the invention is to provide a system for providing a one number service in a telecommunications relay service ("TRS"), the system including a TRS system for providing a transcription service to a user of the TRS system during a phone call with a peer, wherein the TRS system includes a database which stores a phone number and a virtual number of the user, wherein the phone number is assigned from a carrier of the user and the virtual number is assigned from a TRS provider to the user; and a communications device of the user which includes a phone call unit associated with the phone number and a TRS call unit associated with the virtual number. When the user elects to use the one number service and places a call to a phone number of the peer using the TRS call unit, the TRS call unit is connected to the TRS system using the virtual number and then, the TRS system is connected to a communications device of the peer using the phone number of the user as a caller identification ("caller ID") to be displayed on a communications device of the peer.

Another object of the invention is to provide a telecommunications relay service ("TRS") system for providing a one number service, the TRS system including a database which stores a phone number and a virtual number of a user, wherein the phone number is assigned from a carrier of the user and the virtual number is assigned from a TRS provider to the user; and a number handling block to control the database and the caller ID of the user. When the user elects to use the one number service and places a call to a phone number of a peer using a TRS call unit of a communications device of the user, the TRS call unit is connected to the TRS system using the virtual number and then, the TRS system is connected to a communications device of the peer using the phone number of the user as a caller identification ("caller ID") to be displayed on a communications device of the peer.

The advantages of the present invention are: (1) a way for TRS users to reduce the complexity of their use by using cell numbers assigned from mobile carriers as their representative contacts instead of Virtual Numbers assigned from TRS providers; (2) peer users no longer need to save two numbers of TRS user, because only the number represented by the caller ID displayed on the peer user's device suffices; (3) when TRS system receives a call, the TRS system is configured to automatically convert the virtual number to the phone number if the ID-type is "C," or convert the phone number to the virtual number if the ID-type is "V;" (4) the ID-type change easily using TRS call unit; (5) a wide variety of communication devices including (but not limited to) smartphones, land phones, PDAs, tablets/tablet PCs, laptop and desktop computers, etc. having a display can be used with the system; and (6) the system can leverage existing communication infrastructure and devices so that this system may be quickly deployed and adopted without the need for cost-prohibitive investments.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment. Additionally, in all of the embodiments detailed below, call routing includes call forwarding. Accordingly, in all of the embodiments detailed below, a call routing service includes a call forwarding service.

Figure 1:
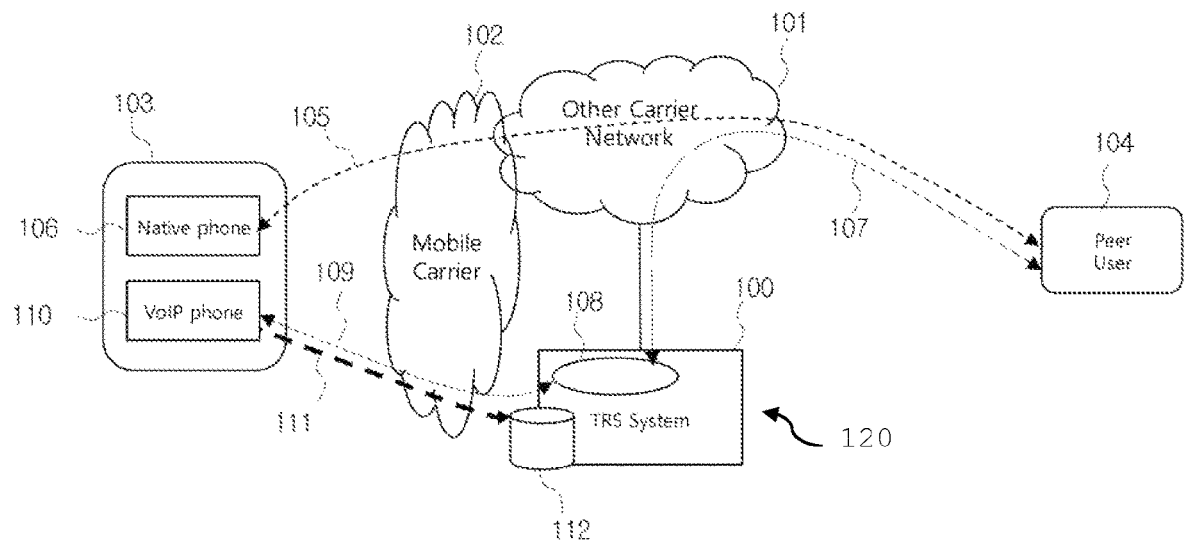
FIG. 1 is a schematic diagram of number service according to embodiments of the present invention that includes a one number service.

FIG. 1 shows a system for providing a one number service in a telecommunications relay service ("TRS"), the system including a TRS system (100) for providing a transcription service to a user of the TRS system (100) during a phone call with a peer, wherein the TRS system (100) includes a database (112) which stores a phone number (202) and a virtual number (203) of the user, wherein the phone number (202) is assigned from a carrier (102) of the user and the virtual number (203) is assigned from a TRS provider (120) to the user; and a communications device (103) of the user which includes a phone call unit (106) associated with the phone number (202) and a TRS call unit (110) associated with the virtual number. When the user elects to use the one number service and places a call to a phone number (202) of the peer using the TRS call unit (110), the TRS call unit (110) is connected to the TRS system (100) using the virtual number and then, the TRS system (100) is connected to a communications device (104) of the peer using the phone number (202) of the user as a caller identification ("caller ID") to be displayed on a communications device (104) of the peer.

Figure 2:
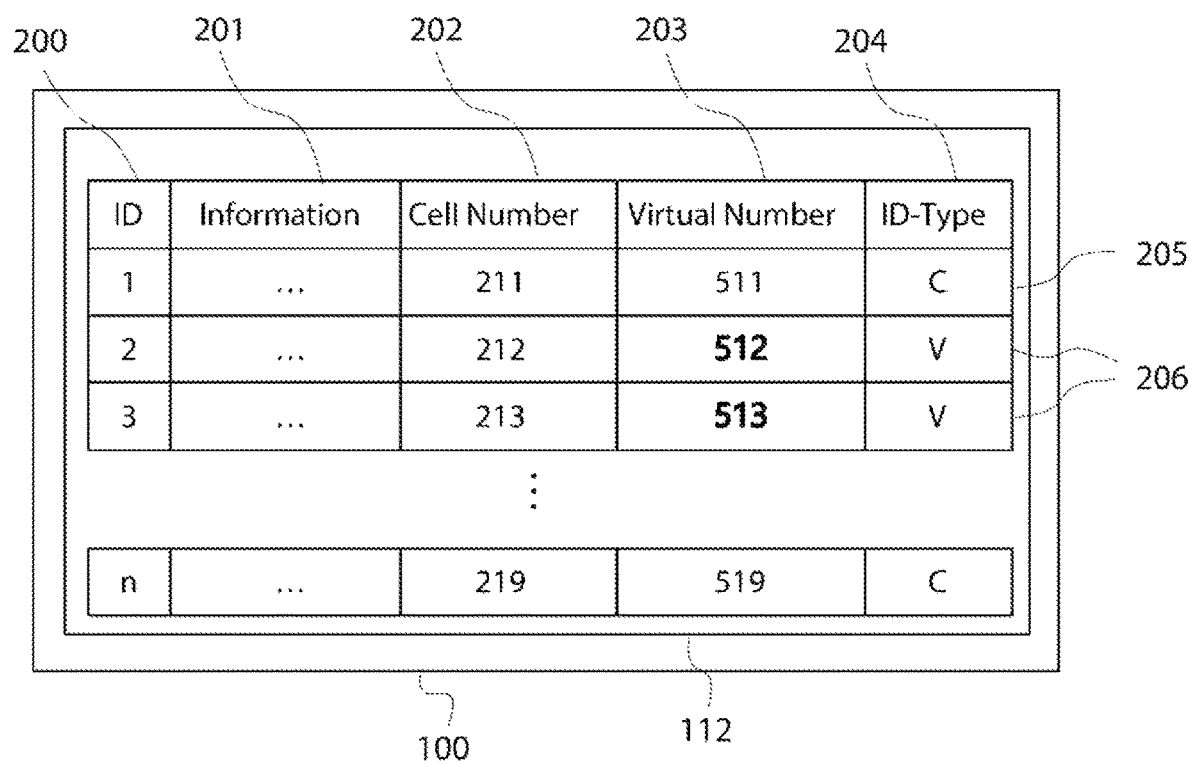
FIG. 2 is a schematic diagram of a database according to embodiments of the present invention.

To determine which number to use (virtual or phone number) and the relationship between the phone number and the virtual number, FIG. 2 shows an example of the database structure used for the database (112) included in this system. The database (112) includes not only the unique key-ID (200) and basic information (201) of the TRS user but also the phone number (202) issued by the mobile carrier (102), virtual number (203) issued by the TRS system (100), and the ID-Type (204) to control the which of the phone number (202) and virtual number (203) is displayed as the caller ID. Basic information may include (but is not limited to) a unique personal ID for the user, the user's name, social security number, address, e-mails, age, appearance descriptors, as well as number(s) of alternate contact(s), and name(s) of the alternate contact(s).

When the TRS user's communication device (103) makes a voice call using a the TRS call unit (110), the phone number (202) is displayed as a caller ID of the TRS user on the terminal of the peer user's communications device (104) if, via the database (112), the ID-type (204) is selected as 'C' (cell Number), or the virtual number (203) if the ID-type (204) is selected as 'V' (Virtual Number). Furthermore, the caller ID-type (204) of the user may indicate whether the user elects to use the one number service or not. Alternatively, for example, the caller ID type (204) "C" may represent to elect to use the one number service and "V" may represent to elect not to use the one number service; alternatively, the ID-type (204) of "C" may represent, or be displayed, as "Yes," and "V" may represent, or be displayed, as "No").

For added control of the database (112) and the caller ID of the user, the TRS system (100) may further include a number handling block (108). After the TRS call unit (110) is connected to the TRS system (100) using the virtual number (203), the number handling block (108) retrieves from the database (112) the phone number (202) of the user associated with the virtual number (203) of the user, and then, the number handling block (108) converts the caller ID of the user from the virtual number (203) of the user to the phone number (202) of the user.

Figure 3:
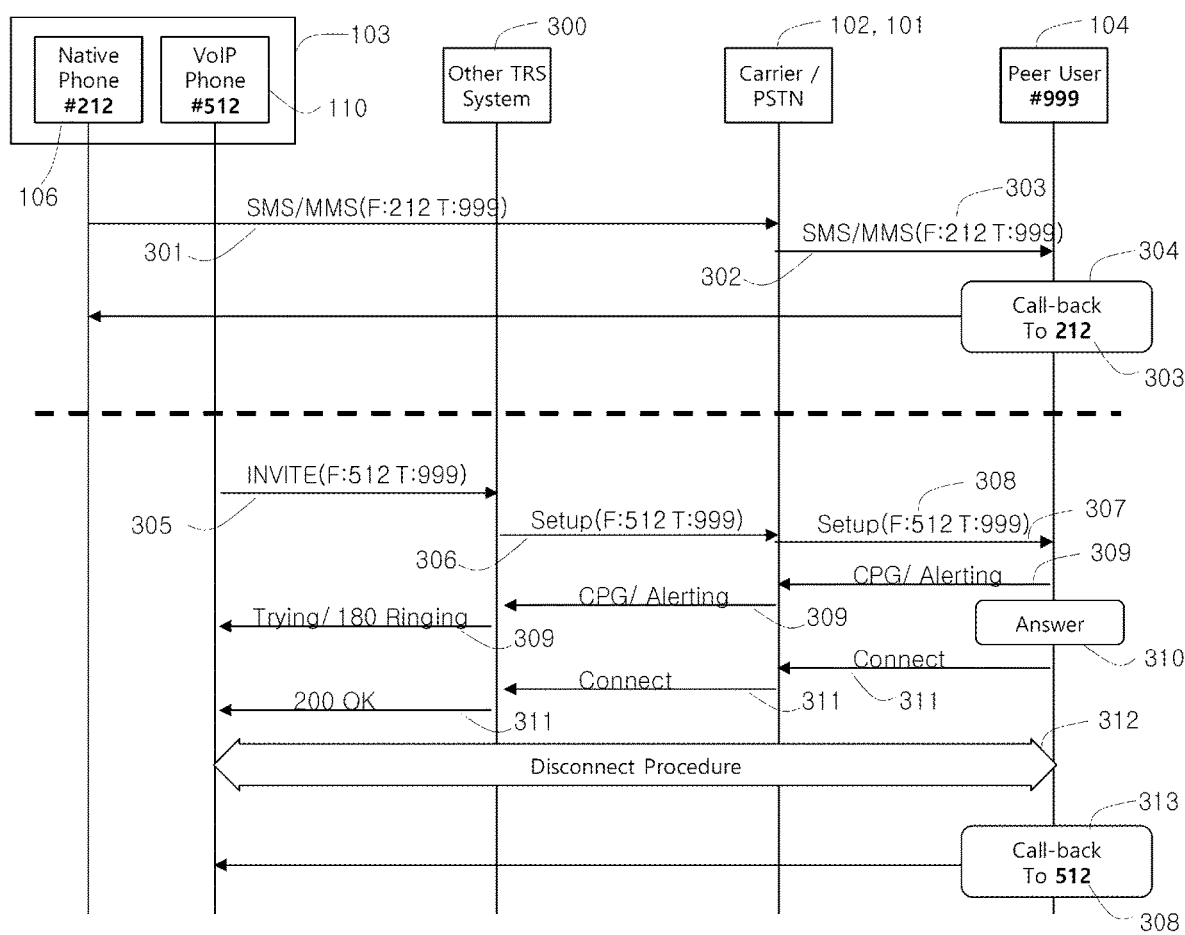
FIG. 3 is a schematic flowchart of a process connecting a TRS user to a peer user according to embodiments of the present invention without the one number service.

FIG. 3 depicts services for a TRS system (300). First, when the TRS user sends an SMS/MMS to the communications device (104) of the peer using the user's communication device (103), the text is sent to the mobile carrier (102) with which the user's communication device (103) is subscribed (301) using the function of the cell phone (212). The mobile carrier (102) forwards this text data to the communications device (104) of the peer through another carrier (101), that is subscribed by the communications device (104) of the peer, or the same carrier (102) as shown (302). The caller ID displayed in the terminal of the communications device (104) of the peer is the phone number (303) assigned by the mobile carrier (102) to which the user's communication device (103) is subscribed, here the user's phone call unit (106). The peer user received this SMS/MMS their communications device (104) will return the call by using the corresponding number (303) displayed as the caller ID to call back the user's communication device (103), which includes the phone call unit (106), as shown (304).

According to FIG. 3, by using the caller ID that corresponds to the user's phone call unit (106), the TRS user cannot hear the peer user's voice since the peer user called the user's phone call unit (106), the user here being hard-of-hearing. Second, when the TRS user makes a voice call using the TRS call unit (110) of the user's communication device (103), the VoIP phone sends a connection request message (305) to the TRS system (300) that includes the virtual number as the caller ID (308), and the TRS system (300) sends the message to the Mobile carrier (102) or PSTN (101) (hereinafter "Public Switched Telephone Network") and then requests connections to the peer user (307). In this case, the caller ID (308) displayed in the terminal of the peer's communication device (104) is the virtual number. Subsequently, the Call Progress and the Alerting Procedure (309) are performed, and the call is made when the peer user responds (310), and the call is terminated (311). When the peer user calls back to the TRS user after the call ends, the call ID (308) is a virtual number, so the call between the TRS user and the peer user can proceed smoothly via TRS. In both situations, peer user needs to recognize and store two phone numbers of the TRS user in their communication device(s) (104), if the peer user sends SMS/MMS to the TRS user or makes a voice call, the user needs to select a phone number that is appropriate for each situation, resulting in confusion. Accordingly, the TRS system (300) shown in FIG. 3 is not preferred.

Figure 4:
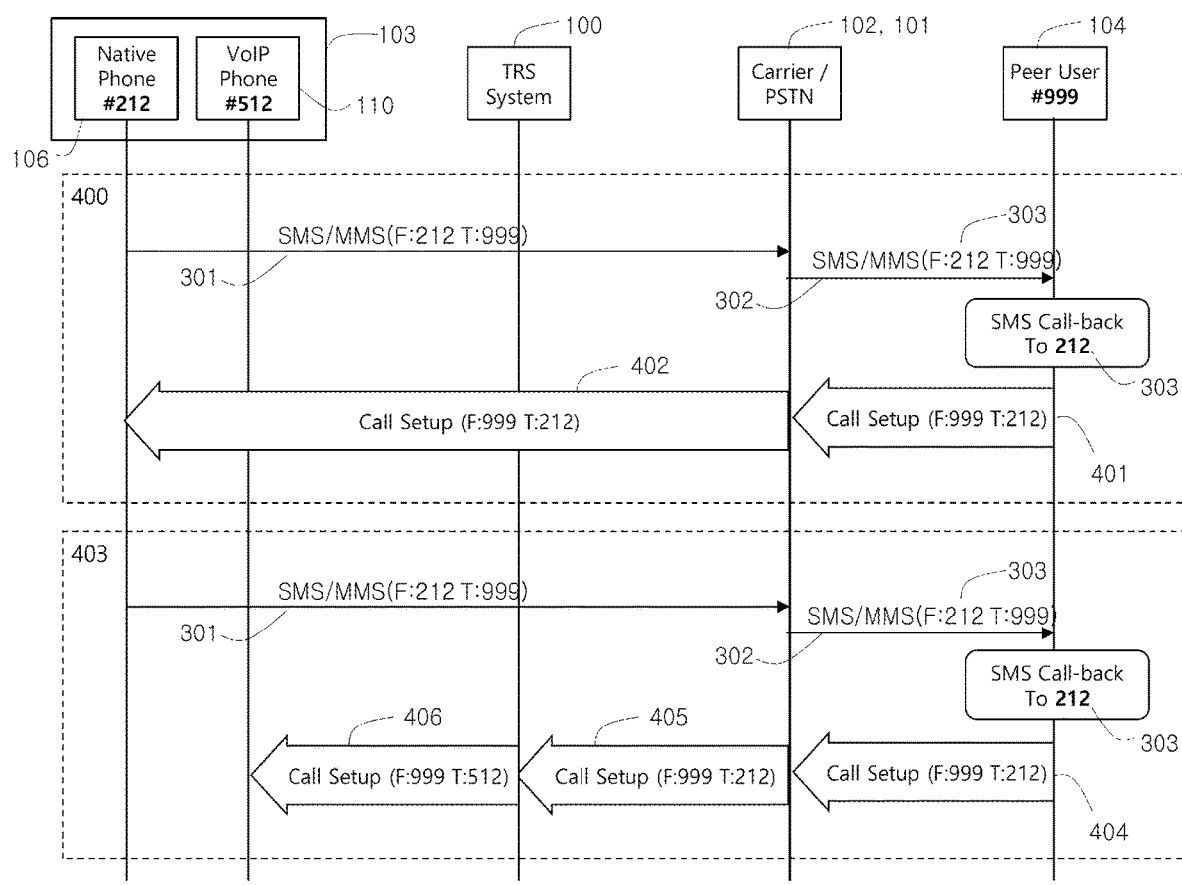
FIG. 4 is a schematic flowchart of a call routing process according to embodiments of the present invention without the one number service and with the one number service.

FIG. 4 shows how the call routing is setup in the system. First, in a system (400) without the call routing service, if the TRS user sends an SMS/MMS to the peer user's communication device (104) as shown (301, 302) using the phone call unit (106) that functions with the TRS user's communications device (103) and the peer user attempts the voice call back using the caller ID (303) displayed in the terminal of the peer user's communication device (104), then the call setup messages are sent to peer user's subscribed carriers (102, 101) (mobile carriers and PSTN). Considering the number displayed as the caller ID (303) of the TRS user as a destination, which had already been received (401), the carrier (102, 101) in this system (400) will deliver the call directly to the TRS user without going through the TRS system (100) due to the lack of a call routing service of this setup, which makes it difficult for the TRS user to maintain the call.

To setup proper call routing, the system (403) shown in FIG. 4 has the TRS user set up their mobile carrier (102) to route the phone call unit (106) number (shown as #212 in FIG. 4) to the virtual number (shown as #512 in FIG. 4) assigned to the TRS provider. When the TRS user sends SMS/MMS to the peer user (301, 302) using the phone call unit's (106) function of the user's communication device (103) and the peer user attempts a voice callback using the caller ID (303) that is displayed as the phone number on the peer user's communications device (104), the call setup message generated from the peer user's communications device (104) is delivered to the mobile carrier (102) of the TRS user through the peer user's carrier (101), as the caller ID (303) of the TRS user as the destination (401). The mobile carrier (102) forwards this message to the TRS system (100). The TRS system (100) forwards this message (406) to the TRS call unit (110) (VoIP or a mobile application) of the user's communication device (103). By configuring these paths, the voice of the peer user can be passed to the TRS system (100), written and then delivered to the TRS call unit (110) of the TRS user with voice and text.

More specifically, to setup the preferred system (403) to enable the one number service as shown in FIG. 4, the user sets up a call routing service with the carrier (102) associated with the phone number of the user so that a call to the phone number (202) of the user is re-directed to the TRS system (100) for the user to receive the call through the TRS call unit (110) of the communications device (103) of the user instead of the phone call unit (106) of the communications device (103) of the user. The communications device (103) of the user further includes a unit for a SMS/MMS unit (106). The SMS/MMS unit (106) is configured to send a text message with the caller ID of the phone number (202) of the user. To enable the one number service, the user sets up a call routing service with the carrier (102) associated with the phone number (202) of the user so that a call to the phone number (202) of the user is re-directed to the TRS system (100) for the user to receive the call through the TRS call unit (110) of the communications device (103) of the user instead of the phone call unit (106) of the communications device (103) of the user.

When the user elects to use the one number service and the peer places a return-call to the phone number (202) of the user which is received from the text message of the user, the communications device (104) of the peer is connected to the TRS system (100) by the carrier (102) of the user instead of connecting to the phone call unit (106) of the communications device (103) of the user, and then, the TRS system (100) retrieves the virtual number (203) of the user associated with the phone number (202) of the user from the database and is connected to the TRS call unit (110) of the communications device (103) of the user using the virtual number (203) of the user.

Furthermore, when the user elects to use the one number service and the peer places a return-call to the phone number (202) of the user which is received from the text message of the user, the TRS system (100) is operative to connect the communications device (104) of the peer to the TRS call unit (110) of the user by the steps of: receiving a call setup request with the phone number (202) of the user which is re-directed to the TRS system (100) by the carrier (102) of the user as shown (514); (2) retrieving from the database (112) the virtual number (203) of the user associated with the phone number (202) of the user as shown (515); and sending an invite message to the TRS call unit (110) of the user as shown (517).

The TRS call unit (110) may be constructed to be connected to the TRS system (100) using a data network and a Voice over Internet Protocol (VoIP), and the system further includes a control connection (111) between the TRS call unit (110) and the database (112) for the user to control and update the database (112). The control connection (111) may be separate from the wireless connection (109). The control connection (111) may be manifested as a mobile application, part of a mobile application, or part of a suite of mobile applications provided by the TRS which may include a graphical user interface linked and synced to the database (112) that allows the TRS subscribed user a degree of, or full, control of, the database (112) to view, update, or change the information included in the database (112).

Figure 5:
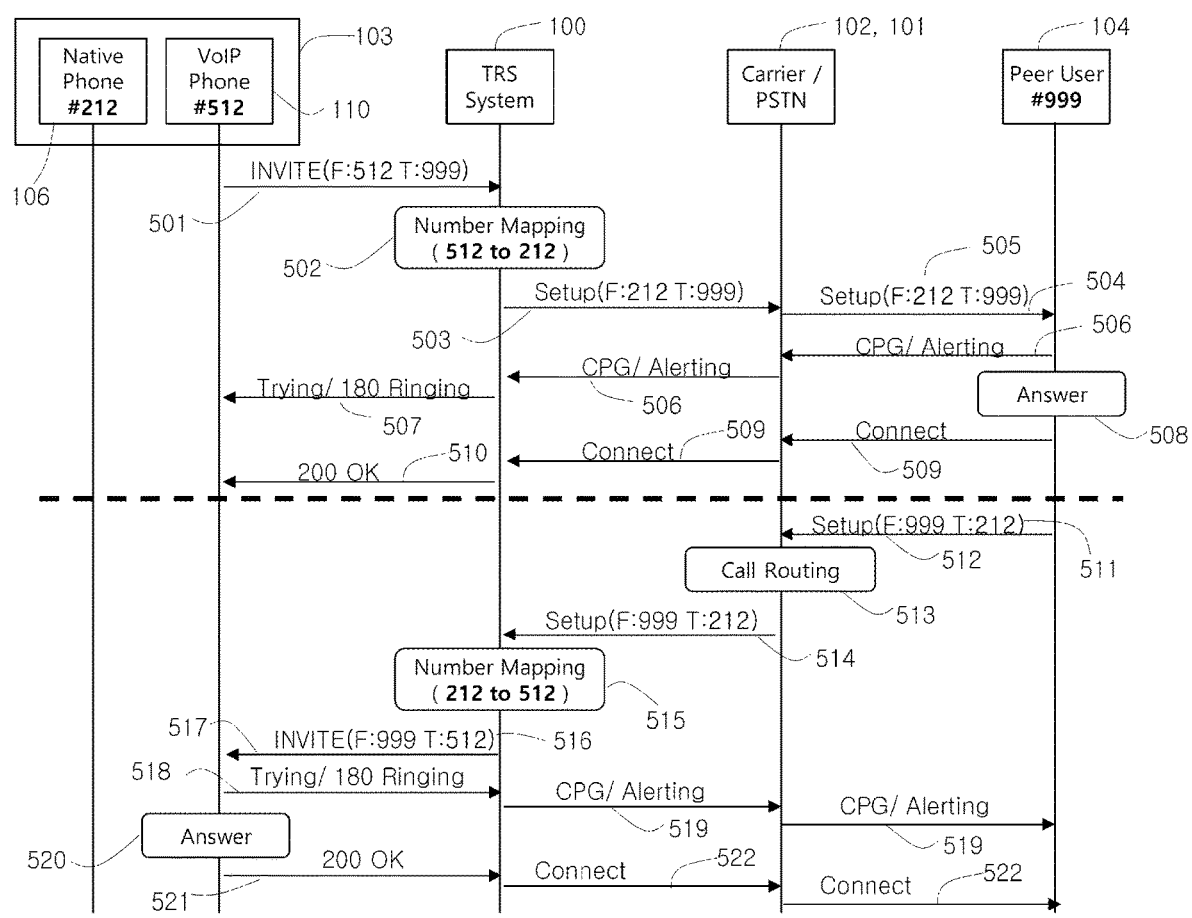
FIG. 5 is a schematic flowchart of a process connecting a TRS user to a peer user according to embodiments of the present invention using the one number service.

FIG. 5 shows a schematic of incoming and outgoing call process between the user's communication device (103) and the peer user's communications device (104) of the preferred embodiment of the system. First, the outgoing call from the TRS user's communication device (103) starts when the TRS user enters the phone number of peer user using the TRS call unit (110) and sends the INVITE message to the TRS system (100). The TRS system (100) modifies the "From" Parameter (Caller ID) of the received INVITE message (501) to a cell number (505) and passes it to the carrier (102, 101) to which the peer user belongs (503) (it may be the same carrier as the TRS user or a different carrier from the TRS user). Carrier(s) (102, 103) delivers this message to the peer user's communications device (104), which rings or signals with a display of the cell number assigned by TRS user's communication device (103) as a caller ID (505). If the peer user responds after the Call Progress and Alerting procedures ("CPG/Alerting") as shown (506, 507), then the connecting procedure for the call is completed (509). After the call is terminated, when the peer user calls back to the TRS user by using the caller ID of the phone call unit (106) in response to the INVITE message (501), as shown in the two communication paths (505, 511), the peer user's return call effectively sends a setup message to the carrier (102,101) to which the peer user is subscribed (512). The carrier (102, 101) routes this call to TRS system (100) based on preset information (513, 514) in the database (112), and TRS system (100) changes the "To" parameter information contained in the received message (514) from the subscriber's cell number (511) to virtual number (516), and then forwards the "To" parameter information using a signal path (109), which may be conducted wirelessly. Upon receipt of this message, the TRS call unit (110) of the user's communication device (103) rings, and when the TRS user responds (518, 519), the connection procedure is completed as shown (521, 522). By using this method, the user's communication device (103), via the TRS, can hide the virtual number so that SMS/MMS messaging, inbound calls, and/or outbound calls can use the number of the phone call unit (106) only, and the peer user's communications device (104) can store just one number (the number of the phone call unit (106)) that the peer user can use when calling or messaging via SMS/MMS the TRS user.

More specifically, when the user elects to use the one number service and places a call to a phone number (202) of the peer using the TRS call unit (110), the TRS system (100) is operative to connect the TRS call unit (110) of the user to the communications device (104) of the peer by the steps of: receiving an invite message with the caller ID of the virtual number (203) which is sent from the TRS call unit (110) as shown (501); retrieving from the database (112) the phone number (202) of the user associated with the virtual number (203) of the user and converting the caller ID of the user from the virtual number (203) of the user to the phone number (202) of the user as shown (502); and sending a call setup request with the caller ID of the user to the communications device (104) of the peer such that the caller ID of the user is displayed on the communications device (104) of the peer as shown (504, 505).

Also, to enable the one number service, the user sets up a call routing service with the carrier (102) associated with the phone number (202) of the user so that a call to the phone number (202) of the user is re-directed to the TRS system (100) for the user to receive the call through the TRS call unit (110) of the communications device (103) of the user instead of the phone call unit (106) of the communications device (103) of the user.

When the user elects to use the one number service and the peer places a call to the phone number (202) of the user using the communications device (104) of the peer, the communications device (104) of the peer is connected to the TRS system (100) by the carrier (102) of the user instead of connecting to the phone call unit (106) of the communications device (103) of the user, and then, the TRS system (100) retrieves the virtual number (203) of the user associated with the phone number (202) of the user from the data base and is connected to the TRS call unit (110) of the communications device (103) of the user using the virtual number (203) of the user. The TRS system (100) is operative to connect the communications device (104) of the peer to the TRS call unit (110) of the user by the steps of:

receiving a call setup request with the phone number (202) of the user which is re-directed to the TRS system (100) by the carrier (102) of the user as shown (514); retrieving from the database (112) the virtual number (203) of the user associated with the phone number (202) of the user as shown (515); and sending an invite message to the TRS call unit (110) of the user as shown (517). To retrieve the virtual number (203) of the user associated with the phone number (202) after the communications device (104) of the peer is connected to the TRS system (100), the number handling block (108) is programmed with instructions to retrieve from the database (112) the virtual number (203) of the user associated with the phone number (202) of the user.

Furthermore, a phone call unit in this embodiment that's used by a TRS user may be a communication device having regular wired and/or wireless call functions. The communication device may be include (but is not limited to) smartphones, land phones, PDAs, tablets/tablet PCs, laptop and desktop computers, etc. having a display can be used with the system. The TRS call unit, in one case may be a VoIP (Voice over Internet Protocol) or, in another case, may be a TRS call application that is downloaded, side-loaded, or pre-loaded into the TRS user's communication device, so just one communication device can feature both native calling and call-features associated with a TRS.

Alternatively, a telecommunications relay service ("TRS") system for providing a one number service, includes a database (112) which stores a phone number (202) and a virtual number (203) of a user, wherein the phone number (202) is assigned from a carrier (102) of the user and the virtual number (203) is assigned from a TRS provider to the user; and a number handling block (108) to control the database (112) and the caller ID of the user. When the user elects to use the one number service and places a call to a phone number (202) of a peer using a TRS call unit (110) of a communications device (103) of the user, the TRS call unit (110) is connected to the TRS system (100) using the virtual number (203) and then, the TRS system (100) is connected to a communications device (104) of the peer using the phone number (202) of the user as a caller identification ("caller ID") to be displayed on a communications device (104) of the peer.

As shown in FIG. 5, when the user elects to use the one number service and places a call to the phone number (202) of the peer using the TRS call unit (110), the TRS system (100) is operative to connect the TRS call unit (110) of the user to the communications device (104) of the peer by the steps of: receiving an invite message with the caller ID of the virtual number (203) which is sent from the TRS call unit (110); retrieving by the number handling block (108) from the database (112) the phone number (202) of the user associated with the virtual number (203) of the user and converting by the number handling block (108) the caller ID of the user from the virtual number (203) of the user to the phone number (202) of the user; and sending a call setup request with the caller ID of the user to the communications device (104) of the peer such that the caller ID of the user is displayed on the communications device (104) of the peer.

Also shown, to enable the one number service, the user sets up a call routing service with the carrier (102) associated with the phone number (202) of the user so that a call to the phone number (202) of the user is re-directed to the TRS system (100) for the user to receive the call through the TRS call unit (110) of the communications device (103) of the user instead of the phone call unit (106) of the communications device (103) of the user.

Here, when the user elects to use the one number service and the peer places a call to the phone number (202) of the user using the communications device (104) of the peer, the communications device (104) of the peer is connected to the TRS system (100) by the carrier (102) of the user instead of connecting to the phone call unit (106) of the communications device (103) of the user, and then, the number handling block (108) of the TRS system (100) retrieves the virtual number (203) of the user associated with the phone number (202) of the user from the data base and the TRS system (100) is connected to the TRS call unit (110) of the communications device (103) of the user using the virtual number (203) of the user.

The database (112) is similarly setup as described above. For example, the database (112) also includes a caller ID type (204) of the user to indicate whether the user elects to use the one number service or not. The caller ID-type "C" may represent to elect and the caller ID-type "V" may represent not to elect; alternatively, "C" may be "Yes" and "V" may be "No".

The TRS system (100) is constructed to be connected to the TRS call unit (110) using a data network and a Voice over Internet Protocol (VoIP), and the TRS system (100) further comprises a control connection between the TRS call unit (110) and the database (112) for the user to control and update the database (112). The control connection (111) may be separate from the VoIP connection (109) (which may be wireless). The control connection (111) may be manifested as a mobile application, part of a mobile application, or part of a suite of mobile applications that provided by the TRS which may include a graphical user interface linked and synced to the database (112) that allows the TRS subscribed user a degree of, or full, control of, the database (112) to view, update, or change the information included in the database (112).

Furthermore, a phone call unit in this embodiment that's used by a TRS user may be a communication device having regular wired and/or wireless call functions. The communication device may be include (but is not limited to) smartphones, land phones, PDAs, tablets/tablet PCs, laptop and desktop computers, etc. having a display can be used with the system. The TRS call unit, in one case may be a VoIP (Voice over Internet Protocol) or, in another case, may be a TRS call application that is downloaded, side-loaded, or pre-loaded into the TRS user's communication device, so just one communication device can feature both native calling and call-features associated with a TRS.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A system for providing a one number service in a telecommunications relay service ("TRS"), comprising:
   a TRS system for providing a transcription service to a user of the TRS system during a phone call with a peer, wherein the TRS system includes a database which stores a phone number and a virtual number of the user, wherein the phone number is assigned from a carrier of the user and the virtual number is assigned from a TRS provider to the user; and
   a communications device of the user which includes a phone call unit associated with the phone number and a TRS call unit associated with the virtual number, wherein when the user elects to use the one number service and places a call to a phone number of the peer using the TRS call unit, the TRS call unit is connected to the TRS system using the virtual number and then, the TRS system is connected to a communications device of the peer using the phone number of the user as a caller identification ("caller ID") to be displayed on a communications device of the peer, wherein to enable the one number service, the user sets up a call routing service with the carrier associated with the phone number of the user so that a call to the phone number of the user is re-directed to the TRS system for the user to receive the call through the TRS call unit of the communications device of the user instead of the phone call unit of the communications device of the user.

2. The system of claim 1, wherein when the user elects to use the one number service and places a call to a phone number of the peer using the TRS call unit, the TRS system is operative to connect the TRS call unit of the user to the communications device of the peer by the steps of:
   receiving an invite message with the caller ID of the virtual number which is sent from the TRS call unit;
   retrieving from the database the phone number of the user associated with the virtual number of the user and converting the caller ID of the user from the virtual number of the user to the phone number of the user; and
   sending a call setup request with the caller ID of the user to the communications device of the peer such that the caller ID of the user is displayed on the communications device of the peer.

3. The system of claim 1, wherein the TRS system further includes a number handling block to control the database and the caller ID of the user.

4. The system of claim 3, wherein after the TRS call unit is connected to the TRS system using the virtual number, the number handling block retrieves from the database the phone number of the user associated with the virtual number of the user, and then, the number handling block converts the caller ID of the user from the virtual number of the user to the phone number of the user.

5. The system of claim 1, wherein when the user elects to use the one number service and the peer places a call to the phone number of the user using the communications device of the peer, the communications device of the peer is connected to the TRS system by the carrier of the user instead of connecting to the phone call unit of the communications device of the user, and then, the TRS system retrieves the virtual number of the user associated with the phone number of the user from the data base and is connected to the TRS call unit of the communications device of the user using the virtual number of the user.

6. The system of claim 5, wherein when the user elects to use the one number service and the peer places a call to the phone number of the user using the communications device of the peer, the TRS system is operative to connect the communications device of the peer to the TRS call unit of the user by the steps of:
   receiving a call setup request with the phone number of the user which is re-directed to the TRS system by the carrier of the user;
   retrieving from the database the virtual number of the user associated with the phone number of the user; and
   sending an invite message to the TRS call unit of the user.

7. The system of claim 5, wherein the TRS system further includes a number handling block to control the database, wherein after the communications device of the peer is connected to the TRS system, the number handling block retrieves from the database the virtual number of the user associated with the phone number of the user.

8. The system of claim 1, wherein to enable the one number service, the user sets up a call routing service with the carrier associated with the phone number of the user so that a call to the phone number of the user is re-directed to the TRS system for the user to receive the call through the TRS call unit of the communications device of the user instead of the phone call unit of the communications device of the user, wherein the communications device of the user further comprises a unit for a short message service ("SMS") or multimedia messaging service ("MMS") (a SMS/MMS unit), wherein the SMS/MMS unit is configured to send a text message with the caller ID of the phone number of the user.

9. The system of claim 8, wherein to enable the one number service, the user sets up a call routing service with the carrier associated with the phone number of the user so that a call to the phone number of the user is re-directed to the TRS system for the user to receive the call through the TRS call unit of the communications device of the user instead of the phone call unit of the communications device of the user.

10. The system of claim 9, wherein when the user elects to use the one number service and the peer places a return-call to the phone number of the user which is received from the text message of the user, the communications device of the peer is connected to the TRS system by the carrier of the user instead of connecting to the phone call unit of the communications device of the user, and then, the TRS system retrieves the virtual number of the user associated with the phone number of the user from the database and is connected to the TRS call unit of the communications device of the user using the virtual number of the user.

11. The system of claim 10, wherein when the user elects to use the one number service and the peer places a return-call to the phone number of the user which is received from the text message of the user, the TRS system is operative to connect the communications device of the peer to the TRS call unit of the user by the steps of:

receiving a call setup request with the phone number of the user which is re-directed to the TRS system by the carrier of the user;

retrieving from the database the virtual number of the user associated with the phone number of the user; and sending an invite message to the TRS call unit of the user.

12. The system of claim 1, wherein the database further includes a caller ID type of the user to indicate whether the user elects to use the one number service or not.

13. The system of claim 12, wherein the TRS call unit is constructed to be connected to the TRS system using a data network and a Voice over Internet Protocol (VoIP), and the system further comprises a control connection between the TRS call unit and the database for the user to control and update the database.

14. A telecommunications relay service ("TRS") system for providing a one number service, comprising:

a database which stores a phone number and a virtual number of a user, wherein the phone number is assigned from a carrier of the user and the virtual number is assigned from a TRS provider to the user; and a number handling block to control the database and the caller ID of the user, wherein when the user elects to use the one number service and places a call to a phone number of a peer using a TRS call unit of a communications device of the user, the TRS call unit is connected to the TRS system using the virtual number and then, the TRS system is connected to a communications device of the peer using the phone number of the user as a caller identification ("caller ID") to be displayed on a communications device of the peer, wherein to enable the one number service, the user sets up a call routing service with the carrier associated with the phone number of the user so that a call to the phone number of the user is re-directed to the TRS system for the user to receive the call through the TRS call unit of the communications device of the user instead of the phone call unit of the communications device of the user.

15. The TRS system of claim 14, wherein when the user elects to use the one number service and places a call to the phone number of the peer using the TRS call unit, the TRS system is operative to connect the TRS call unit of the user to the communications device of the peer by the steps of:

receiving an invite message with the caller ID of the virtual number which is sent from the TRS call unit;

retrieving by the number handling block from the database the phone number of the user associated with the virtual number of the user and converting by the number handling block the caller ID of the user from the virtual number of the user to the phone number of the user; and sending a call setup request with the caller ID of the user to the communications device of the peer such that the caller ID of the user is displayed on the communications device of the peer.

16. The system of claim 15, wherein when the user elects to use the one number service and the peer places a call to the phone number of the user using the communications device of the peer, the communications device of the peer is connected to the TRS system by the carrier of the user instead of connecting to the phone call unit of the communications device of the user, and then, the number handling block of the TRS system retrieves the virtual number of the user associated with the phone number of the user from the database and the TRS system is connected to the TRS call unit of the communications device of the user using the virtual number of the user.

17. The system of claim 14, wherein the database further includes a caller ID type of the user to indicate whether the user elects to use the one number service or not.

18. The system of claim 17, wherein the TRS system is constructed to be connected to the TRS call unit using a data network and a Voice over Internet Protocol (VoIP), and the TRS system further comprises a control connection between the TRS call unit and the database for the user to control and update the database.

* * * * *